United States Patent [19]

Schmitt et al.

[11] Patent Number: 5,712,616
[45] Date of Patent: Jan. 27, 1998

[54] SYSTEM FOR MONITORING THE CONDITION OF TIRES

[75] Inventors: Johannes Schmitt, Markgroeningen; Ulrich Hessmert, Schwieberdingen, both of Germany

[73] Assignee: Robert Bosch GmbH, Stuttgart, Germany

[21] Appl. No.: 677,070
[22] Filed: Jul. 9, 1996

[30] Foreign Application Priority Data

Jul. 26, 1995 [DE] Germany ............... 195 27 294.3

[51] Int. Cl.⁶ .......................................... B60C 23/00
[52] U.S. Cl. .............................. 340/442; 340/444
[58] Field of Search .................... 340/442, 444; 200/61.22; 116/34 R; 73/146.5, 146.4

[56] References Cited

U.S. PATENT DOCUMENTS

| | | | |
|---|---|---|---|
| 4,876,528 | 10/1989 | Walker et al. | 340/444 |
| 5,343,741 | 9/1994 | Nishihara et al. | 340/444 |
| 5,483,220 | 1/1996 | Kushimoto et al. | 340/444 |

FOREIGN PATENT DOCUMENTS

| | | | |
|---|---|---|---|
| 3236520 | of 1984 | Germany . | |
| 3630116 | 3/1988 | Germany | 340/442 |
| 2226434 | 6/1990 | United Kingdom | 340/442 |

*Primary Examiner*—Jeffery Hofsass
*Assistant Examiner*—Sihong Huang
*Attorney, Agent, or Firm*—Felfe & Lynch

[57] ABSTRACT

An evaluation circuit forms quotients based on the detected wheel speeds and compares the quotients to each other. Depending on the results of the comparison, a signal which represents the condition of the tires is generated, which signal activates a display for the benefit of the driver. In a preferred embodiment, the rate of change of the quotients over time is also determined to provide a basis for signal generation.

14 Claims, 6 Drawing Sheets

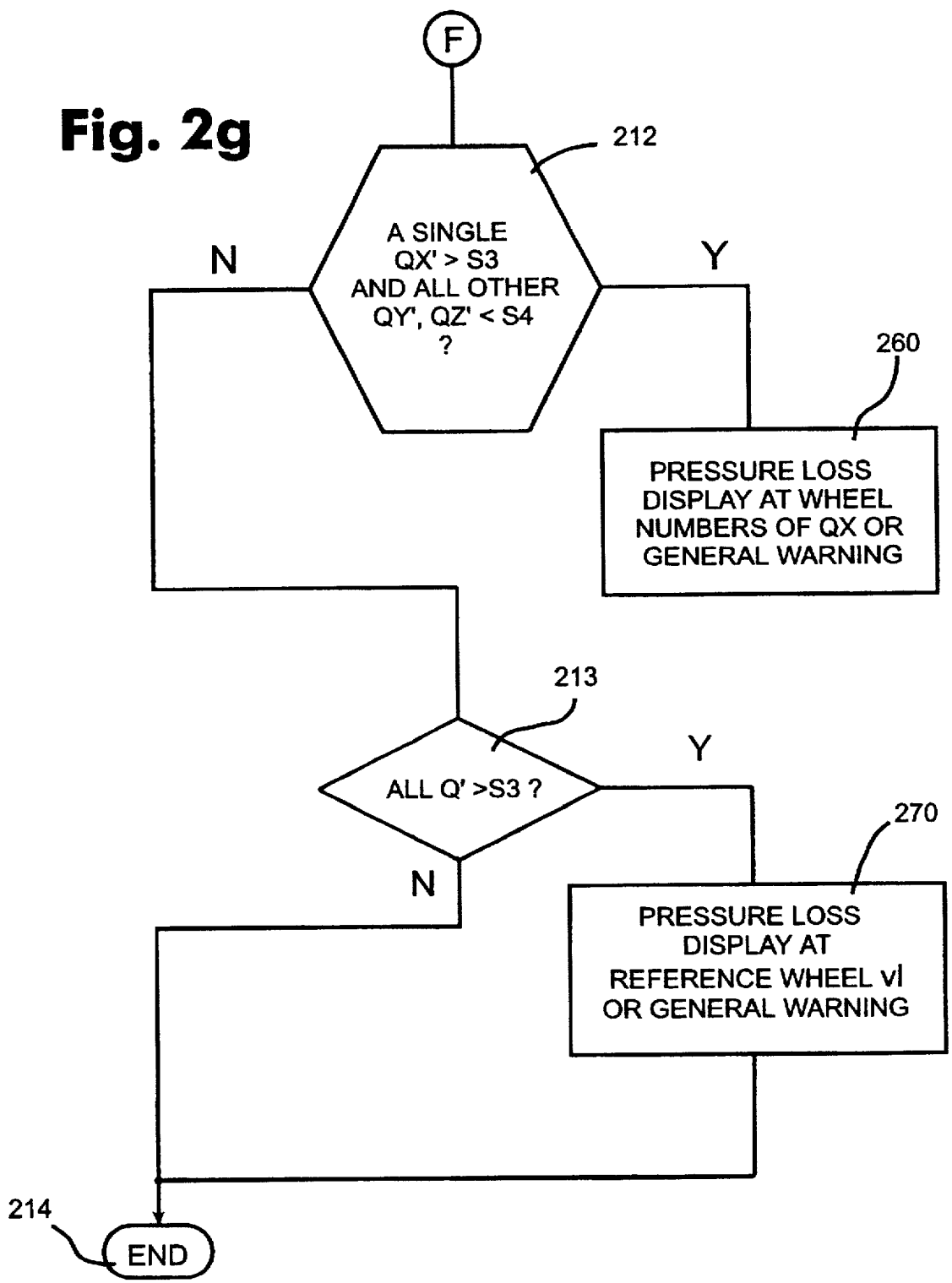

SYSTEM FOR MONITORING THE CONDITION OF TIRES

BACKGROUND OF THE INVENTION

The invention is based on a system for monitoring the condition of tires by generating values which are a function of detected rotational movements of the wheels and generating a signal representing the condition of the tires based on a comparison of the values.

The state of the art includes systems of many different types for identifying the condition of tires. In addition to systems which detect the tire pressure directly, there are also systems in which changes in the diameter of the tires caused by the loss of air or by an increase in abrasion can be detected by evaluating the rotational velocity of the wheels.

For example, a device for displaying the condition of the tires of a vehicle is described in DE-OS 36 30 116 and DE-PS 32 36 520, in which the differences between the rotational velocities of individual wheels are determined under certain operating conditions (unbraked, unaccelerated, straight-ahead travel). It is proposed in particular that these rotational velocities be normalized to the associated vehicle velocity.

Similarly, U.S. Pat. No. 4,876,528 discloses using differences between the rotational velocities of individual wheels to identify the condition of the tires.

DE-OS 41 13 278 describes a process for equalizing the tolerances of tires, according to which, to equalize the velocities of the wheels, the ratios of the rotational velocities of the wheels on each side of the vehicle are formed, and these ratios are then used to derive corrective values suitable for achieving the equalization.

EP-A1 0 656 268 describes a system in which, to correct the rotational velocities of the wheels in a motor vehicle, the velocities of the wheels are divided by the velocity of a reference wheel (calculation of a quotient). A monitoring of the condition of the tires on the wheels is not described.

SUMMARY OF THE INVENTION

The object of the present invention is to optimize the detection of the condition of the tires.

The invention proceeds from a system for monitoring the condition of the tires on the wheels of a motor vehicle, this system being provided with means for detecting the rotational movement of the wheels. In general, these means are sensors which can detect variables representing the rotational velocities or speeds of the wheels. The system is also provided with means for evaluating the rotational speeds of the wheels by comparing them with each other and, depending on the results of the comparison, for generating a signal which represents the condition of the tires. Means are also provided for responding to the signal by displaying the condition of the tires.

According to the invention, the evaluation means are designed in such a way that quotients of the generated variables are formed, whereupon these quotients are compared with each other. Depending on the results of the comparison, and without any direct measurement of pneumatic pressure in any of the tires a signal is then generated which represents the condition of the tires.

In contrast to the state of the art indicated above, therefore, it is not the differences between the rotational speeds of the wheels which are detected, but rather the quotients of the rotational speeds, which are then compared to detect the condition of the tires.

In an advantageous embodiment of the invention, it is provided that the evaluation means are designed in such a way that one of the wheels is selected and that, to form the quotients, the speeds of the other wheels are put into relationship to the speed of this selected wheel.

It can also be provided that the evaluation means are designed to perform a test to determine whether or not at least two of the formed quotients are within a predefinable range and whether or not one of the formed quotients deviates by a predefinable amount from the quotients which are within the range. If it is found that one of these quotients does deviate by a predefinable amount from the quotients within the range, the appropriate signal is sent to the display means.

The evaluation means can be designed so that, if it is found that all of the determined quotients are below a predefinable threshold and within a predefinable range, the signal is sent to the display means.

In yet another elaboration, it is provided that the evaluation means are designed so that the change over time in the formed quotients is determined. If it is found in this case that at least one of the determined changes over time in the quotients deviates by a predefinable amount from the determined changes over time in the other quotients, the signal is sent to the display means.

The evaluation means can be designed so that, when it is found that all of the determined changes over time are above a predefinable threshold, the signal is sent to the display means.

The evaluation of the changes over time offers the advantage that even small changes in the condition of the tires which occur suddenly (such as a sudden loss of air) are recognized quickly and reliably.

It is especially advantageous for the quotients to be formed and/or for the signal to be generated only in a defined range of the longitudinal velocity of the vehicle (e.g., within the interval of 20 km/h to 100 km/h). It can also be provided that the quotients are formed and/or the signal generated only when it is found that the vehicle is traveling straight ahead and/or when the vehicle is traveling straight ahead without any acceleration or braking, this straight-ahead travel and/or this unaccelerated, unbraked straight-ahead travel being determined, for example, as a function of a variable representing a steering motion and/or a transverse acceleration of the vehicle and/or as a function of certain variables ($N_{ij}$) which are generated to represent the rotational movement of the wheels and/or as a function of an actuation of a brake light switch.

It is especially advantageous to combine the tire condition detection process according to the invention with a known tire tolerance equalization process in such a way that the tire condition detection is implemented after the completion of the tire tolerance equalization.

The tire condition detection according to the invention can also be carried out only at the command of the driver of the vehicle and/or as part of maintenance work on the vehicle.

It is advantageous for the tire condition detection process according to the invention to be allowed only while the vehicle is traveling on a level plane (not traveling uphill or downhill).

It is especially advantageous to store the values determined by means of the tire condition detection process according to the invention and/or the known tire tolerance equalization process in a nonvolatile memory unit before the supply voltage is turned off. As a result, the stored values can be read again from memory after the supply voltage has been turned back on.

BRIEF DESCRIPTION OF THE DRAWING

FIGS. 2a–2g describe an exemplary embodiment on the basis of flow charts.

DETAILED DESCRIPTION OF THE PREFERRED EMBODIMENT

Figure 1:
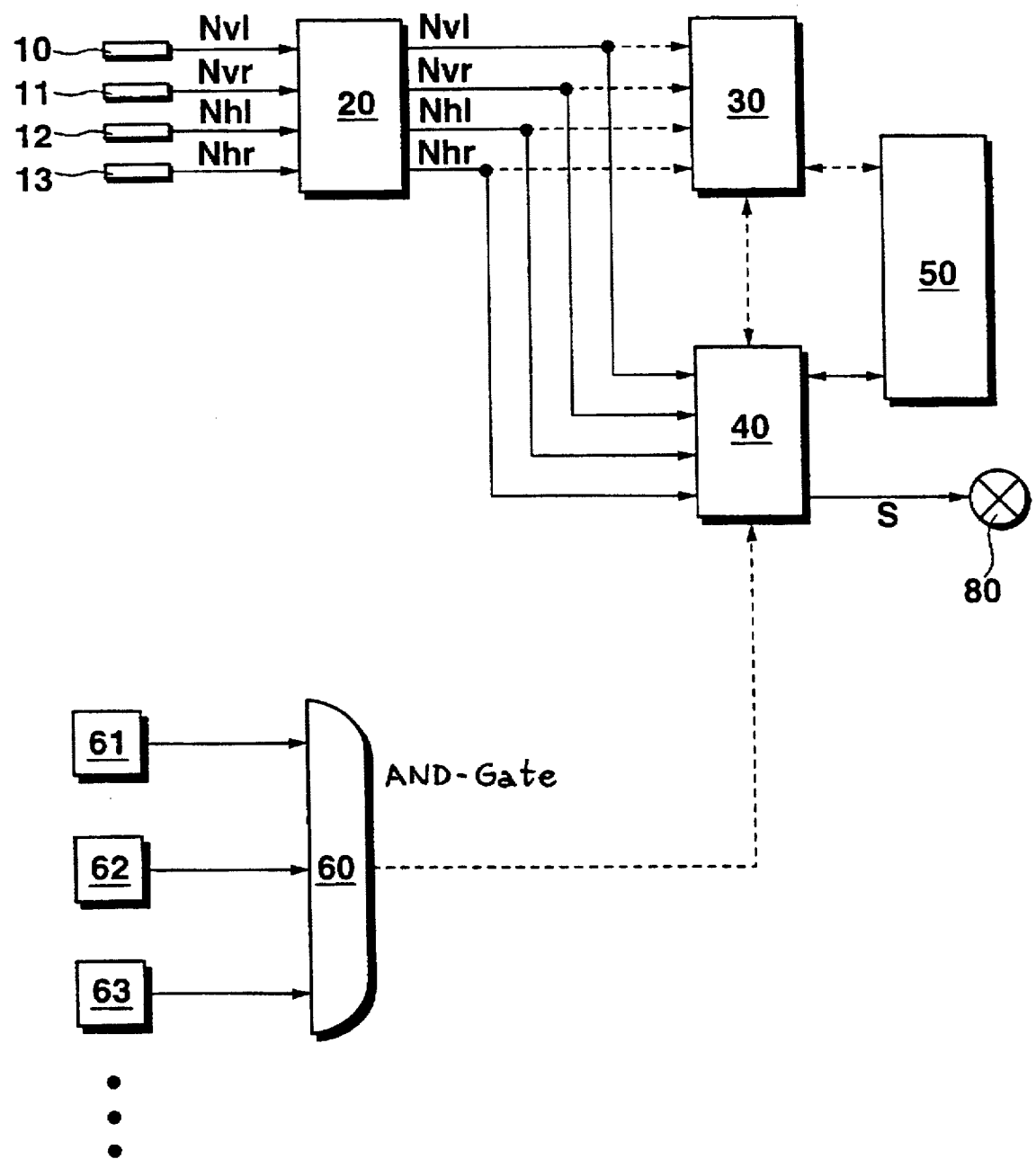
FIG. 1 shows a block circuit diagram of the system according to the invention.

In FIG. 1 individual speed sensors 10, 11, 12, 13 sense the rotational velocities $N_{ij}$ ($N_{vl}$, $N_{vr}$, $N_{hl}$, and $N_{hr}$) of the four wheels (not shown) of a motor vehicle. The index "i" is used to designate the axle of the vehicle, i.e., the front (i=v) or rear (i=h) axle, on which the wheel is mounted; and the index "j" is used to designate the side of the vehicle, i.e., the right (j=r) or left (j=l) side, on which the wheel is located.

The wheel velocities $N_{ij}$ are sent to an ABS/ASR (antilock braking system/anti-slip regulation) module 20. ABS/ASR module 20 is designed in the manner of known antilock brake systems and/or anti-slip regulation systems, and it serves to calculate variables (e.g., wheel slip and/or wheel delay) from the wheel speeds in a manner known in and of itself in order to adjust as desired the tendency of the wheels to lock and/or to continue to turn.

In addition, wheel speed signals $N_{ij}$ can be sent to unit 30 for a tire tolerance equalization. Here, in a manner known in and of itself, correction values for correcting the wheel speed signals are determined. See, e.g., U.S. Pat. No. 5,415,469. This is done because tires of different diameters on the wheels can simulate different slip values, which can thus impair the ABS and/or ASR functions. For this purpose, in a manner known in and of itself, the wheel speeds are compared with each other under certain operating conditions (no slip, e.g., unbraked, unaccelerated, straight-ahead travel), and the correction values are derived from the deviations. The correction values can then be stored in a memory unit 50.

An essential part of the present invention is unit 40, which detects the condition of the tires. The wheels speeds $N_{ij}$ are also sent to it. If a tire defect is discovered, a display device 80 is activated by a signal S from unit 40. In the simplest case, this display device 80 can be warning light, which merely indicates whether or not a tire defect has been detected. In this case, signal S needs to assume only two different values. Display device 80 can also be designed in such a way that it shows which tire has the defect.

FIG. 1 also shows means 60, 61, 62, and 63, which are provided to determine the operating conditions under which the tire condition detection process according to the invention occurs. To recognize whether or not the vehicle is being braked, a brake light switch 61 is provided. Steering conditions (driving around a curve) are detected by means of a transverse acceleration sensor 62 and/or a steering angle sensor 63. It is also possible to provide means for recognizing a certain acceleration state of the vehicle, e.g., a longitudinal acceleration sensor. If, as can be seen in FIG. 1, these signals are sent to the input side of an AND gate 60, then there will be a signal on the output side of the AND gate 60 whenever the vehicle is in a state of unbraked, straight-ahead travel. This signal is sent to unit 40 for detecting the condition of the tires.

The way in which unit 40 functions will now be described in greater detail on the basis of FIG. 2.

Figure 2A:
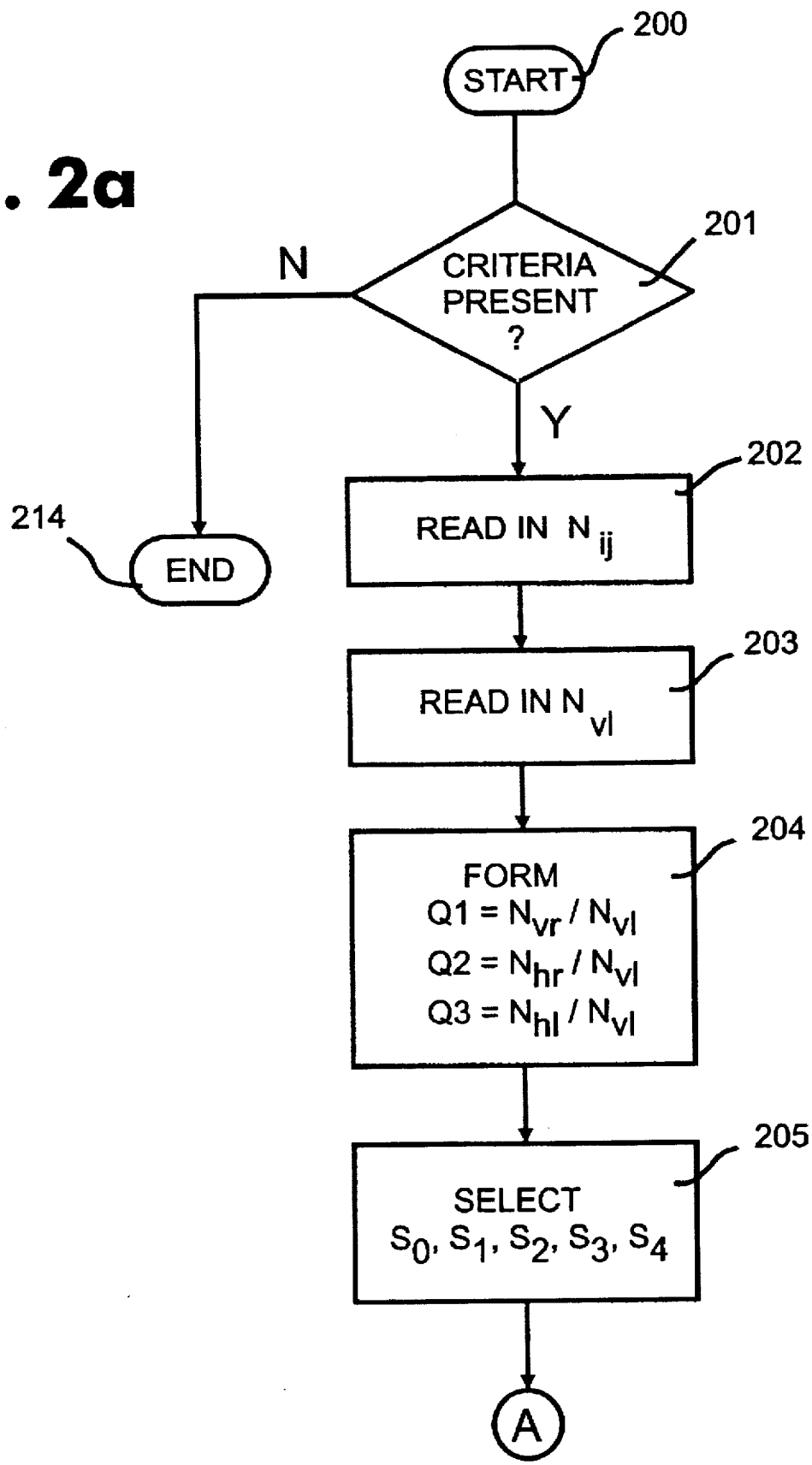
Figure 2B:
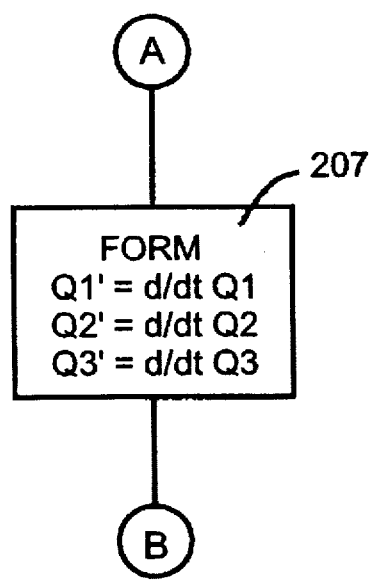
Figure 2C:
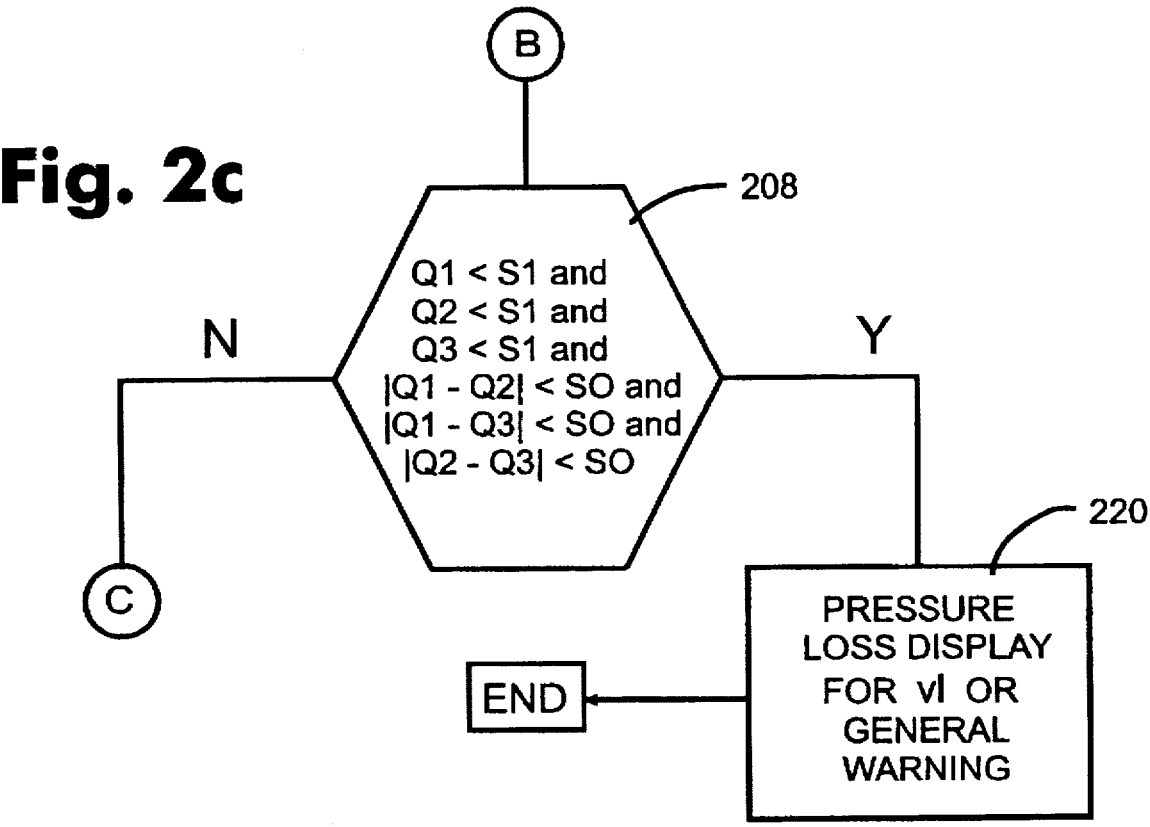
Figure 2D:
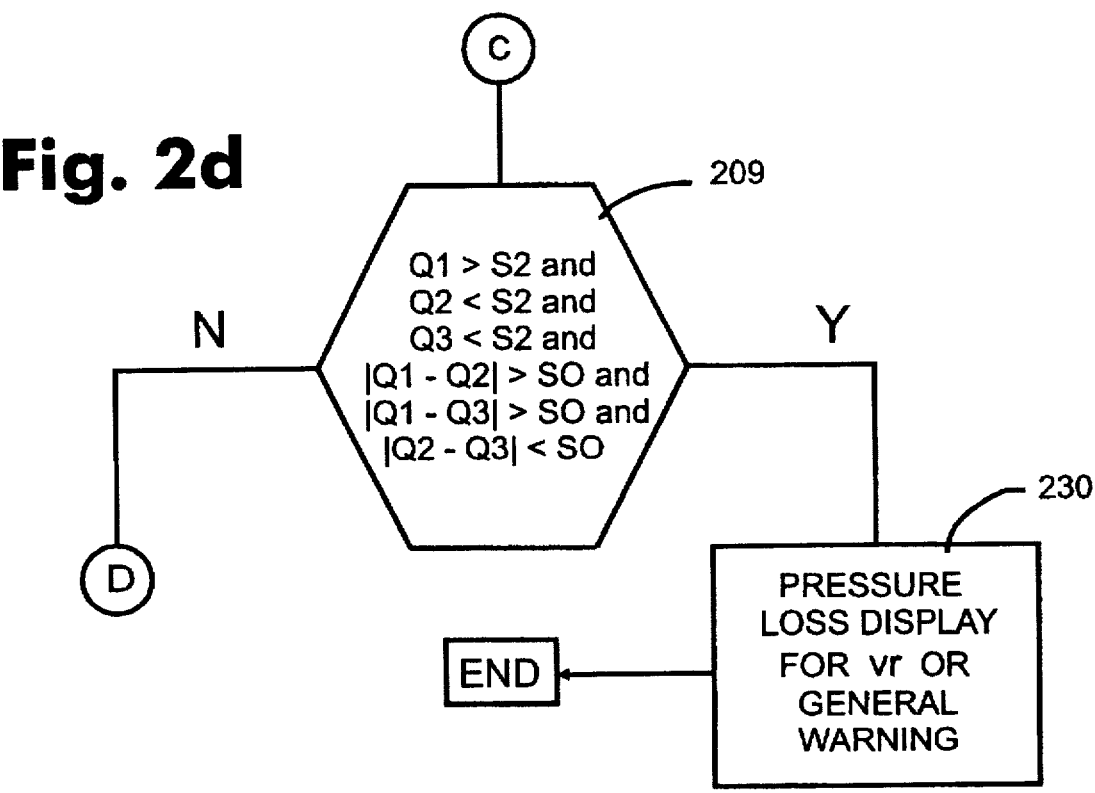
Figure 2E:
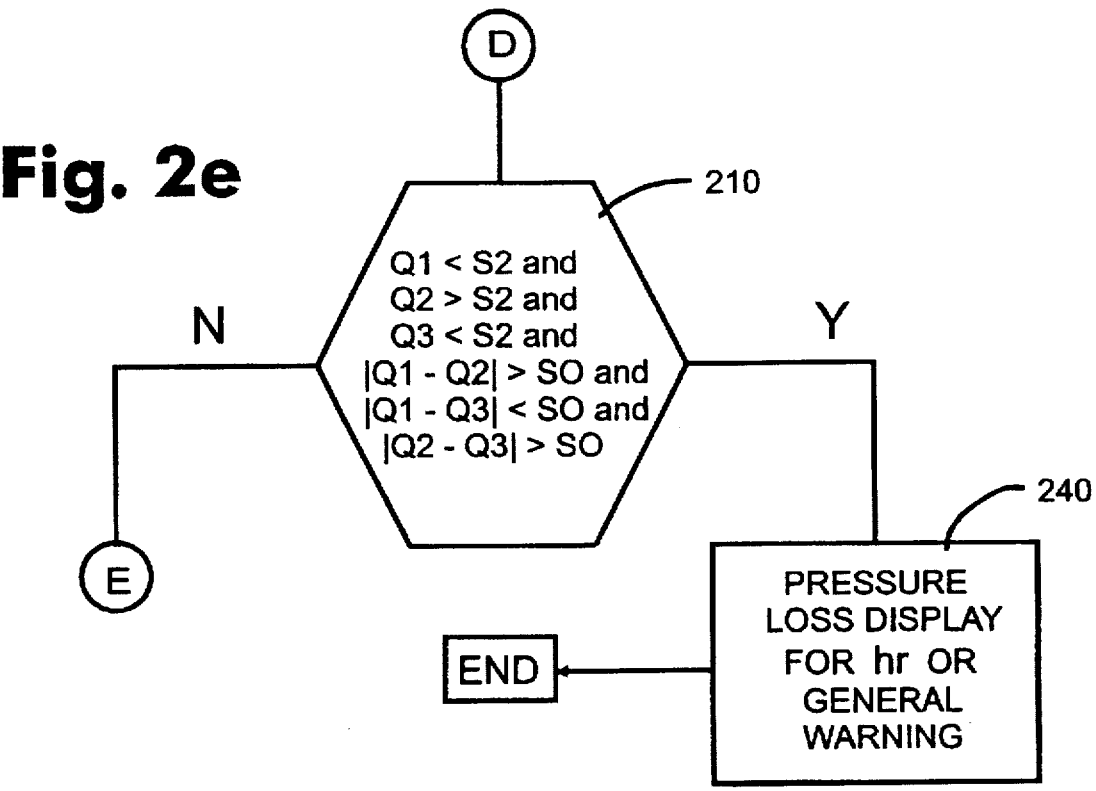
Figure 2F:
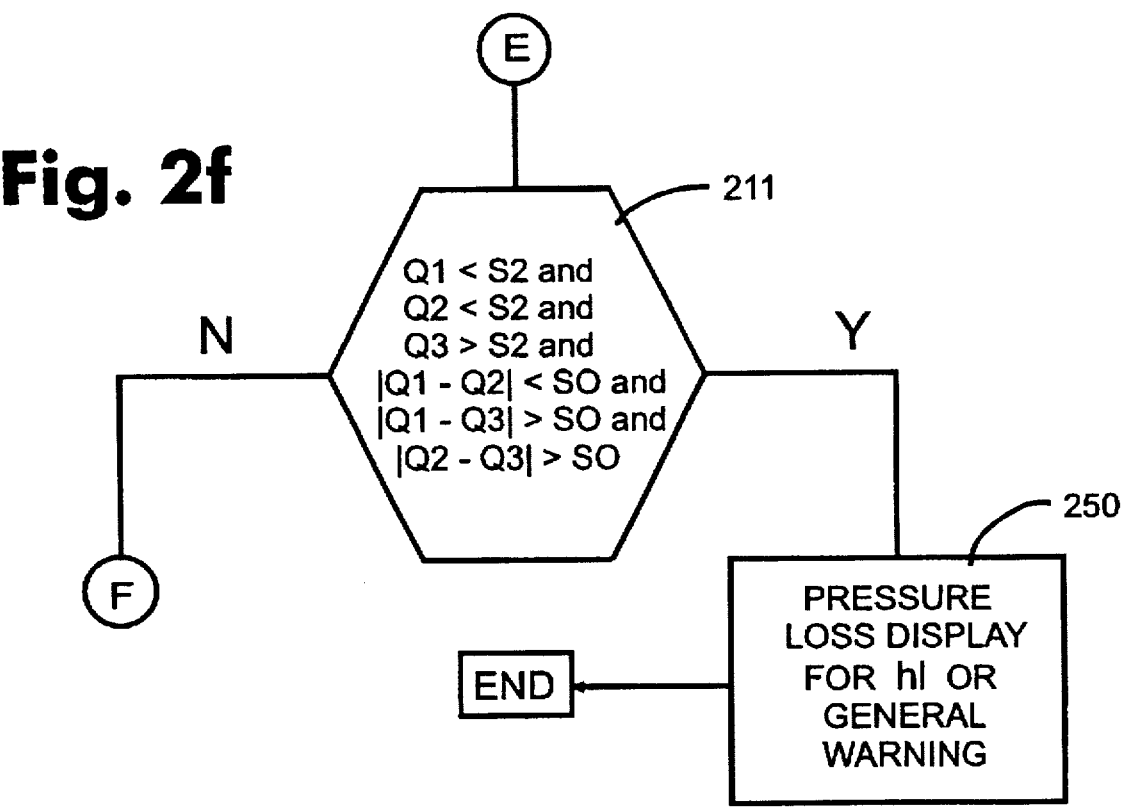

As soon as the program starts at step 200 in FIG. 2a, it checks to see in step 201 whether or not the criteria for a tire condition detection are present. As described above, this is determined in the present exemplary embodiment on the basis of the signal from AND gate 60. The criterion is fulfilled whenever unbraked (brake light switch 61), straight-ahead travel (steering angle sensor 63, transverse acceleration sensor 62) is present. If it is found in step 201 that the measurement criterion is not fulfilled, the program jumps directly to the end at 214. But if the measurement criterion is fulfilled, the current wheel speeds $N_{ij}$ are accepted as input in step 202.

In step 203, the front left wheel (wheel speed $N_{vl}$) is selected in this exemplary embodiment, whereupon, in step 204, the other three wheel speeds ($N_{vr}$, $N_{hr}$, $N_{hl}$) are divided by speed $N_{vl}$ of the selected wheel. As a result, the three quotients $Q_1=N_{vr}/N_{vl}$, $Q_1=N_{hr}/N_{vl}$, and $Q_3=N_{hl}/N_{vl}$ are obtained.

In step 205, threshold values $S_0$, $S_1$, $S_2$, $S_3$, and $S_4$ are selected, and/or selected/predetermined threshold values are accepted as input. These threshold values are applicable variables, which are adjusted to the type of vehicle in question. This can be done by means of tests, for example, in which certain tire conditions are produced in a defined manner. The calculation of the changes over time $Q_1'$, $Q_2'$, and $Q_3'$ of these quotients is accomplished in step 207.

In steps 208 to 213, as shown in FIGS. 2c–2f, the quotients and their changes over the course of time are compared with the threshold values $S_1$ to $S_4$, and the results of the comparison in steps 208, 209, 210, and 211 are linked logically with "AND". If the questions asked in steps 208, 209, 210, and 211 are answered "yes", then in respective steps 220, 230, 240, and 250 the driver is informed that a pressure loss has occurred at a specific wheel. As an alternative, a single pressure loss display can be used to inform the driver as a collective warning.

In detail, questions 208, 209, 210, and 211 have the following background.

If there are no tire conditions present which are relevant in terms of a display, all of the wheel velocities are essentially the same. This means that all the quotients have an approximate value of "1" If a pressure loss is present only in the selected reference wheel (here vl), this leads to an increase in the speed $N_{vl}$ of the reference wheel, whereupon all of the quotients $Q_1$, $Q_2$, and $Q_3$ assume a similar value smaller than "1". If a pressure loss exists at a wheel which has not been selected as the reference wheel (in this case vr, hl, or hr), this means that only the quotient which has the speed of the wheel with the pressure loss as numerator becomes significantly greater than "1". At the same time, all of the other quotients in this case continue to carry a value essentially equal to "1". This is established in question steps 208, 209, 210, and 211.

In the first part of step 208, it is established whether all of the quotients $Q_1$, $Q_2$, and $Q_3$ are smaller than a threshold value $S_1$ (less than "1"); of course, it is also possible to select different threshold values $S_{11}$, $S_{12}$, and $S_{13}$ (less than "1") for the individual quotients. If it is then determined in the second part of question 208 that all of the quotients are close together (the differences between the quotients remain below a threshold $S_0$ or within a certain range), this can only mean that the speed has increased or a loss of pressure has occurred at the reference wheel vl. This is displayed in step 220.

In step 209, it is established whether the quotients $Q_2$ and $Q_3$ are in the range around the value "1" (threshold value $S_2$ is selected to be close to "1"). If only quotient $Q_1$ now exceeds threshold $S_2$, this indicates that only the wheel vr has experienced an excessive increase in rotational speed. If in addition quotients $Q_2$ and $Q_3$ are quite close together, whereas the difference between these quotients and $Q_1$ is significantly greater, then in step 230 the display will show a defect at wheel vr.

The process implemented in steps 210 and 211 for the purpose of detecting a defect in tires hr and hl, respectively, is analogous to that of step 209.

If all of the questions asked in steps 208, 209, 210, and 211 are answered "no", the following steps 212 and 213 will check to see whether an abrupt or sudden (rapid) change in rotational speed (abrupt pressure loss) has occurred. Whereas steps 208, 209, 210, and 211 detect changes in rotational speed which occur under more-or-less steady-state conditions, steps 212 and 213 detect dynamic changes. This approach considerably increases the effectiveness of the system according to the invention.

If all of the questions asked in steps 208, 209, 210, and 211 are answered "no", step 212 will ask whether or not a single one ($Q_x'$) of the changes over time $Q_1'$, $Q_2'$, and $Q_3'$ in the quotients is greater than threshold value $S_3$ while simultaneously all of the other changes over time in the quotients ($Q_y'$, $Q_z'$) are smaller than threshold $S_4$. The indices x, y, and z are from the ranges 1, 2, and 3. If this is the case, then in step 260 the driver is informed that a (sudden) pressure loss has occurred at a specific wheel, namely, the one assigned to the quotient Qx. If, for example, in step 212 $Q_x$ is equal to $Q_2$, then in step 260 wheel hr, whose speed $N_{hr}$ is in the numerator of $Q_2$, shows up as defective in the display. In this case as well, as an alternative, the driver can be informed merely in the form of a general warning that a "pressure loss" has occurred. In the other case, in step 213 all of the changes over time $Q_1'$, $Q_2'$, and $Q_3'$ are compared with threshold value $S_3$. If all of the changes over time are greater than threshold value $S_3$, then in step 270 the driver is informed that a (sudden) pressure loss has occurred at the reference wheel (vl). Here, too, it is also possible as an alternative for the driver to be informed merely as a general warning that a "pressure loss" has occurred. In the other case, the program terminates at step 214.

The evaluation of quotients $Q_1$, $Q_2$, and $Q_3$ to determine the values $S_0$–$S_4$ is also known from EP-A 0 656 268, which is incorporated herein by reference.

What is claimed is:

1. Apparatus for monitoring the condition of tires on the wheels of a motor vehicle, said apparatus comprising means for detecting rotational movements of the wheels and generating values ($N_{vl}$, $N_{vr}$, $N_{hl}$, $N_{hr}$) as a function of respective rotational movements, evaluation means for forming quotients $Q_1$, $Q_2$, $Q_3$ which represent three of said values divided by a common fourth one of said values, and for comparing said quotients with each other, and for generating a signal which represents the condition of the tires based on said comparison without any direct measurement of pneumatic pressure in any of said tires, and display means for displaying the condition of said tires in response to said signal.

2. Apparatus as in claim 1 wherein said values ($N_{vl}$, $N_{vr}$, $N_{hl}$, $N_{hr}$) are wheel speeds of respective wheels.

3. Apparatus as in claim 2 wherein $Q_1 = N_{vr}/N_{vl}$, $Q_2 = N_{hr}/N_{vl}$, and $Q_3 = N_{hl}/N_{vl}$.

4. Apparatus as in claim 1 wherein said evaluation means determines whether at least two of said quotients are within a predefined range and whether one of said quotients other than said at least two deviates by a predetermined amount from said quotients in said range and, when these conditions are met, generates said signal which represents the condition of the tires.

5. Apparatus as in claim 1 wherein said evaluation means determines changes over time $Q_1'$, $Q_2'$, $Q_3'$ of respective quotients $Q_1$, $Q_2$, $Q_3$, determines whether at least one of said changes over time deviates by a predefined amount from the changes over time other than said at least one and, when this condition is met, generates said signal which represents the condition of the tires.

6. Apparatus as in claim 1 wherein said evaluation means determines changes over time $Q_1'$, $Q_2'$, $Q_3'$ of respective quotients $Q_1$, $Q_2$, $Q_3$, determines whether all of said changes over time are above a predefinable threshold and, when this condition is met, generates said signal which represents the condition of the tires.

7. Apparatus as in claim 1 further comprising means for determining longitudinal velocity of the vehicle, said evaluation means only generating said signal when said longitudinal velocity is in a predefined range.

8. Apparatus as in claim 1 further comprising means for determining when said vehicle is traveling straight ahead, said evaluation means only generating said signal when said vehicle is traveling straight ahead.

9. Apparatus as in claim 8 further comprising means for determining whether said vehicle is unaccelerated, said evaluation means only generating said signal when said vehicle is traveling straight ahead and unaccelerated.

10. Apparatus as in claim 8 further comprising means for determining whether said vehicle is unbraked, said evaluation means only generating said signal when said vehicle is traveling straight ahead and unbraked.

11. Apparatus as in claim 1 wherein said evaluation means determines whether all of said quotients are below a predefined threshold and within a predefined range and, when these conditions are met, generates said signal which represents the condition of the tires.

12. Apparatus for monitoring the condition of tires on the wheels of a motor vehicle, said apparatus comprising means for detecting rotational movements of the wheels and generating values ($N_{vl}$, $N_{vr}$, $N_{hl}$, $N_{hr}$) as a function of respective rotational movements, evaluation means for forming quotients $Q_1$, $Q_2$, $Q_3$ which represent three of said values divided by a common fourth one of said values, for determining whether at least two of said quotients are within a predefined range and whether one of said quotients other than said at least two deviates by a predetermined amount from said quotients in said range and, when these conditions are met, for generating a signal which represents the condition of the tires, and display means for displaying the condition of said tires in response to said signal.

13. Apparatus for monitoring the condition of tires on the wheels of a motor vehicle, said apparatus comprising means for detecting rotational movements of the wheels and generating values ($N_{vl}$, $N_{vr}$, $N_{hl}$, $N_{hr}$) as a function of respective rotational movements, evaluation means for forming quotients $Q_1$, $Q_2$, $Q_3$ which represent three of said values divided by a common fourth one of said values, for determining changes over time $Q_1'$, $Q_2'$, $Q_3'$ of respective quotients $Q_1$, $Q_2$, $Q_3$, for determining whether at least one of said changes over time deviates by a predefined amount from the changes over time other than said at least one and, when this condition is met, for generating a signal which represents the condition of the tires, and display means for displaying the condition of said tires in response to said signal.

14. Apparatus for monitoring the condition of tires on the wheels of a motor vehicle, said apparatus comprising means for detecting rotational movements of the wheels and generating values ($N_{v,l}$, $N_{v,r}$, $N_{h,l}$, $N_{h,r}$) as a function of respective rotational movements, evaluation means for forming quotients $Q_1$, $Q_2$, $Q_3$ which represent three of said values divided by a common fourth one of said values, for determining changes over time $Q_1'$, $Q_2'$, $Q_3'$ of respective quotients $Q_1$, $Q_2$, $Q_3$, for determining whether all of said changes over time are above a predefinable threshold and, when this condition is met, for generating a signal which represents the condition of the tires, and display means for displaying the condition of said tires in response to said signal.

* * * * *